A. J. & H. SCHEPP.
BALE HOOK.
APPLICATION FILED MAY 22, 1915.
1,180,196.
Patented Apr. 18, 1916.
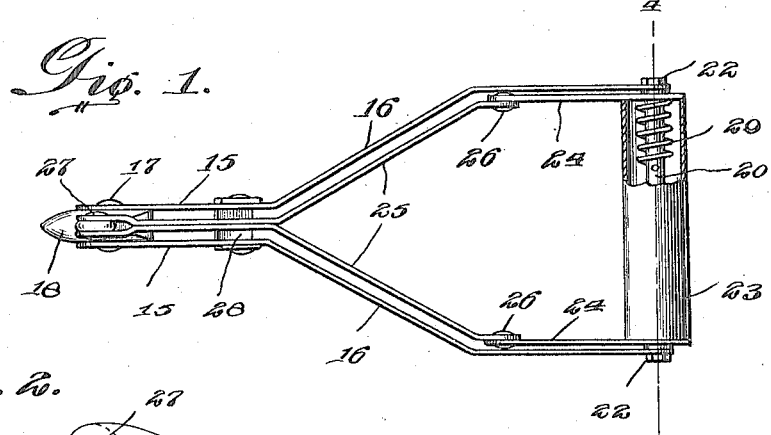
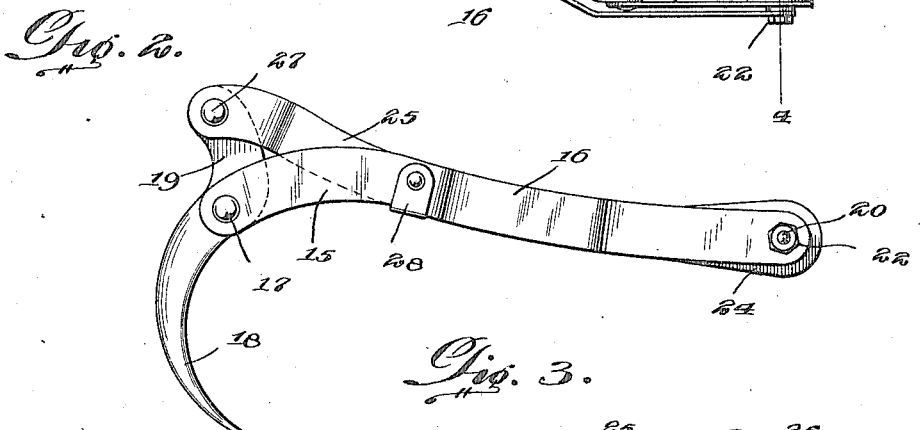
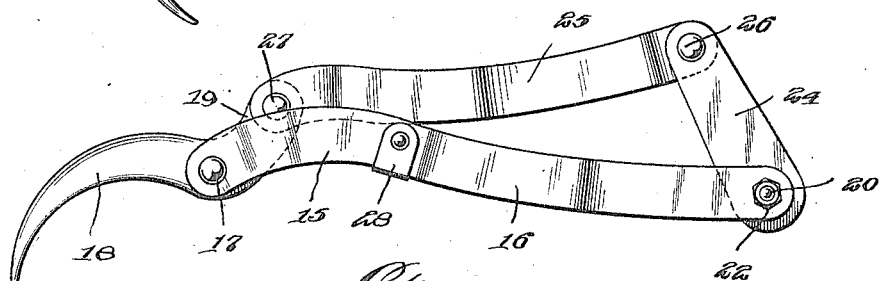
Witnesses
Frederick L. Fox.
Inventors
A. J. Schepp.
H. Schepp.
By Victor J. Evans.
Attorney
THE COLUMBIA PLANOGRAPH CO., WASHINGTON, D. C.

UNITED STATES PATENT OFFICE.

ALBERT J. SCHEPP AND HERMAN SCHEPP, OF MANHATTAN, KANSAS.

BALE-HOOK.

1,180,196. Specification of Letters Patent. Patented Apr. 18, 1916.

Application filed May 22, 1915. Serial No. 29,862.

*To all whom it may concern:*

Be it known that we, ALBERT J. SCHEPP and HERMAN SCHEPP, citizens of the United States, residing at Manhattan, in the county of Riley and State of Kansas, have invented new and useful Improvements in Bale-Hooks, of which the following is a specification.

This invention relates to bale hooks, and it has for its object to produce a bale hook of simple and improved construction which by a slight manipulation will automatically adjust itself to permit of its being readily disengaged from a bale or other object engaged thereby.

A further object of the invention is to produce a bale hook having an engaging member which is pivotally supported and means whereby said engaging member may be locked in engaging position and released from such engaging position by a slight manipulation of the handle.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a plan view partly in section of a bale hook constructed in accordance with the invention. Fig. 2 is a side view showing the device in engaging position. Fig. 3 is a side view showing the device with the engaging member in releasing position. Fig. 4 is a sectional view taken through the handle on the line 4—4 in Fig. 1.

Corresponding parts in the several figures are denoted by like characters of reference.

The improved device comprises a frame having side members 15 which are provided intermediate their front and rear ends with offsets 16, whereby the forward ends of said side members will be disposed relatively close together, while the rearward ends will be spaced relatively wide apart. A pivot member 17 which connects the forward ends of the side members together serves to support an engaging member or hook 18 having an upwardly extending arm 19. The rearward ends of the side members are connected together and spaced apart by a bolt 20 having shoulders or offsets 21 on which the side members abut, the ends of the bolts being threaded for engagement with the nuts 22 whereby the parts are assembled.

Supported on the bolt 20 for rotary movement about the axis thereof is a handle consisting of a sleeve 23 which is provided at the ends thereof with arms 24 which are rigidly connected therewith, said arms being normally positioned adjacent to the widely spaced rear ends of the side members 15. The arms 24 are connected with the arm 19 of the hook or engaging member 18 by means of rods or bars 25 which are pivotally connected at their rear ends with the arms 24, as seen at 26, the forward ends of said bars being pivotally connected at 27 with the arm 19. The forward portions of the bars 25 are positioned closely together so as to lie in substantially parallel relation to the forward portions of the side members 15; the rearward ends of the bars 25 are divergently disposed so as to lie in substantially parallel relation to the offset portions 16 of the side members 15. The side members 15 are connected together by a cross piece 28 lying in the path of the bars 25 so as to obstruct the downward movement thereof beyond a predetermined limit.

Coiled about the bolt 20 within the sleeve or handle 23 is a spring 29, one end of which is connected with the sleeve, the other end being connected with the bolt 20, the tension of said spring being exerted to so rotate the sleeve about the axis of the bolt that the arms 24 will be moved downwardly with respect to the frame composed of the side members 15 until the bars 25 engage the stop member 28 at a point below the dead center of the pivotal points 26 and 27.

It will be observed that when the parts are in the relative position just described, the engaging member or hook 18 will have been moved to a position substantially at right angles to the side members 15 of the frame, being held or locked securely in this position owing to the inability of the bars 25 to rise above the dead center. The hook will thus be used in the customary fashion for the purpose of handling bales of hay or other material, the hook or engaging member being thrust into the bale that is being handled. To release the hook from the bale it is only necessary to turn the sleeve or handle about its axis, with a lifting movement of the hand, against the tension of the spring, thus releasing or unlocking the hook or engaging member which will now straighten out to the position shown in Fig. 3, enabling it to be readily withdrawn from the bale in a quick and convenient manner which is not only time-saving, but also productive of less strain on the operator than is caused by the use of an ordinary rigid bale hook.

Having thus described the invention, what is claimed as new, is:—

1. In a device of the class described, a frame, a hook pivoted at one end of the frame and having an arm extending therefrom, a handle supported for rotation at the other end of the frame and having radial arms, and a link connection between the arms extending from the handle and the arm extending from the hook.

2. In a device of the class described, a frame, a hook pivoted at one end of the frame and having an arm extending therefrom, a spring actuated tubular handle supported for rotation at the other end of the frame and having a radial arm, and a link connection between the arm extending from the handle and the arm extending from the hook.

3. In a device of the class described, a frame, a hook pivoted at one end thereof and having an arm extending therefrom, a spring actuated tubular handle supported for rotation at the other end of the frame and having a radial arm, a link connection between the radial arm extending from the tubular handle and the arm extending from the hook, and a stop member connected with the frame and lying in the path of the link connection.

4. In a device of the class described, a frame having side members provided with offsets intermediate their front and rear ends whereby the rear ends of said side members are spaced relatively wide apart, a hook pivoted between the front ends of the frame members and having an arm extending therefrom, a bolt spacing and connecting the rear ends of the frame members, a tubular handle mounted for rotation on the bolt, said handle having radial arms, a spring about the bolt within the handle and connected terminally with the bolt and the handle to rotate the latter in one direction about the axis of the bolt, bars connecting the arms extending from the handle with the arm extending from the pivoted hook, and a cross piece connected with the side members of the frame and lying in the path of said bars to limit the movement thereof in one direction, thereby locking the parts in adjusted position.

In testimony whereof we affix our signatures in presence of two witnesses.

ALBERT J. SCHEPP.
HERMAN SCHEPP.

Witnesses:
 OTIS FREDERICK,
 M. H. ALLINGHAM.

Copies of this patent may be obtained for five cents each, by addressing the "Commissioner of Patents, Washington, D. C."